J. FARNSWORTH.
Car Wheel.
No. 10,184. Patented Nov. 1, 1853.
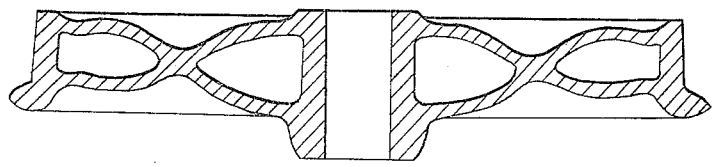
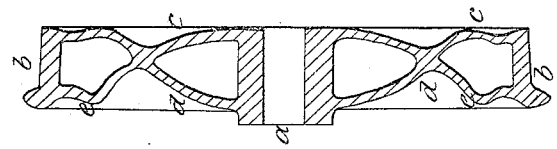
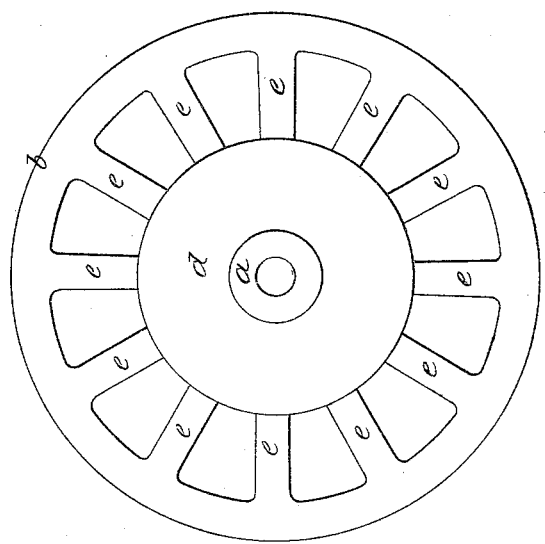

UNITED STATES PATENT OFFICE.

JOSEPH FARNSWORTH, JR., OF MADISON, INDIANA.

CAR-WHEEL.

Specification of Letters Patent No. 10,184, dated November 1, 1853.

*To all whom it may concern:*

Be it known that I, JOSEPH FARNSWORTH, Jr., of Madison, in the county of Jefferson and State of Indiana, have invented a new and useful Improvement in Cast-Iron Car-Wheels, of which the following is a full, clear, and exact description, reference being had to the accompanying drawing, which makes part of this specification, and in which—

Figure 1 represents an elevation of that side of the wheel, on which the spokes are placed; and Fig. 2 a section through the axis of the same; and Fig. 3 similar section of wheel with modified form of spokes.

The drawing represents a wheel having a hub (*a*) and flanged rim (*b*) constructed and arranged in the usual manner, and they are connected by a curved annular disk (*c*) extending from the outer end of the hub to the outer edge of the rim, and by a curved annular disk (*d*) extending from the inner end of the hub to about the middle of the other disk, into which it merges at that point whence a series of curved spokes (*e*) spring up and extend to the flanged or inner edge of the rim. The spokes are only connected with the outer disk (*c*) at their inner ends, and therefore they form a series of flexible elastic props between it and the rim, instead of the rigid inelastic support which is formed by casting into the angle formed by the meeting of the outer disk and rim a series of brackets as has heretofore been done, and which often causes the wheel to break in a line round the inner ends of the brackets. By this construction of the wheel I obtain the rigidity and strength resulting from the double and single disks where these constitute the best connections of the hub and rim, combined with spokes where they by reason of their greater elasticity and flexibility are the best.

I am aware that P. W. Gates made a cast iron car-wheel, in which the rim is connected to the central parts, by two sets of short spokes, but this (without admitting its priority to my invention) I do not claim, as my improvement relates exclusively to that class of wheels in which a disk extends from the hub to the rim, my object being to support the rim and strengthen the disk by flexible supports which will perform their duty without straining and endangering the breaking of the disk, as in the case of the wheels of this class, before mentioned.

Therefore what I claim as my invention and desire to secure by Letters Patent is—

A cast iron car wheel constructed as herein described, but I make no claim to any part of the wheel by itself, nor to any other combination of parts than that above set forth.

In testimony whereof, I have hereunto subscribed my name.

J. FARNSWORTH, JR.

Witnesses:
  P. H. WATSON,
  PETER HANNAY.